UNITED STATES PATENT OFFICE.

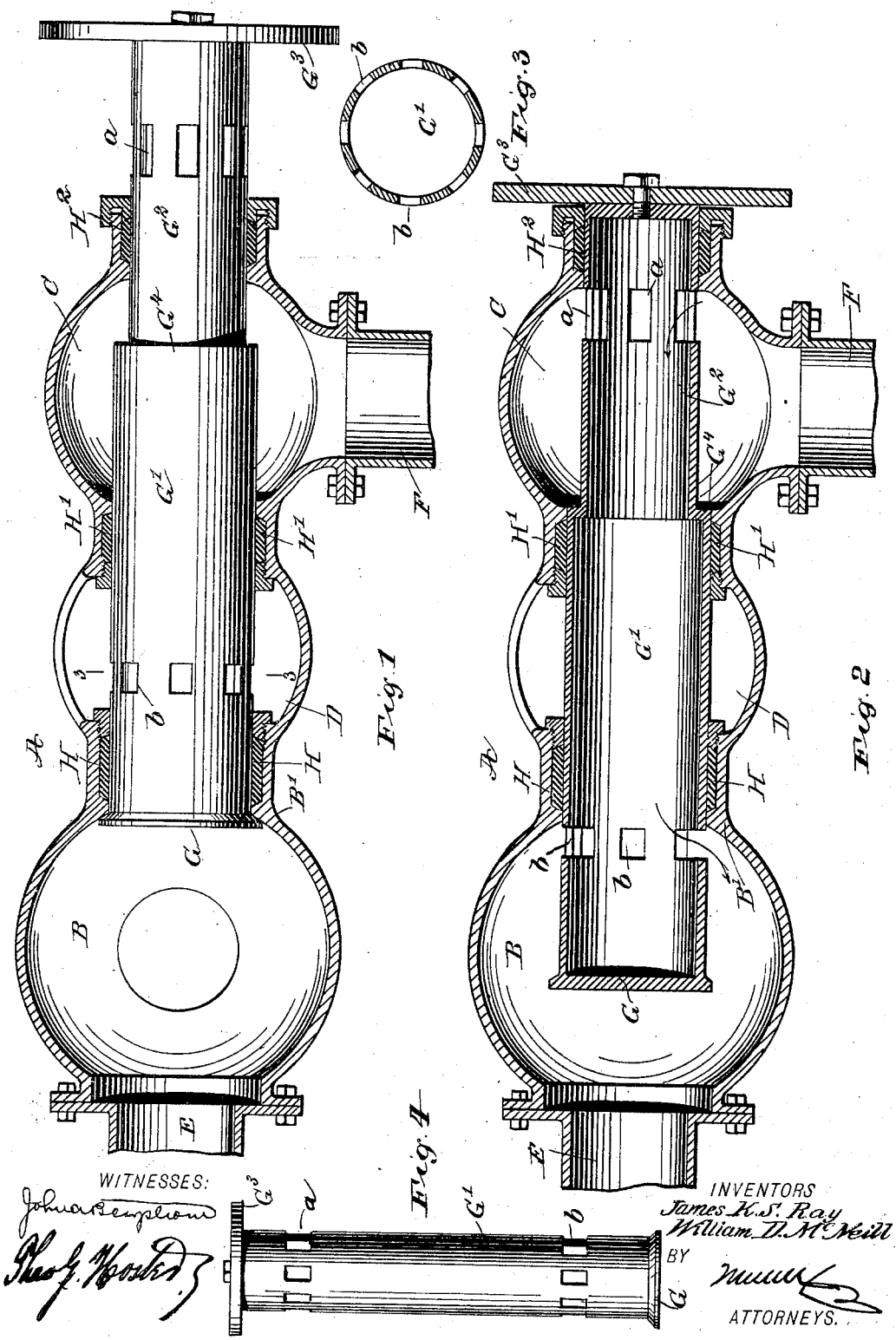

JAMES KING STRINGFIELD RAY AND WILLIAM DAVID McNEILL, OF WHITMIRE, SOUTH CAROLINA.

DRY VALVE.

SPECIFICATION forming part of Letters Patent No. 719,259, dated January 27, 1903.

Application filed May 3, 1902. Serial No. 105,792. (No model.)

*To all whom it may concern:*

Be it known that we, JAMES KING STRINGFIELD RAY and WILLIAM DAVID MCNEILL, citizens of the United States, and residents of Whitmire, in the county of Newberry and State of South Carolina, have invented a new and Improved Dry Valve, of which the following is a full, clear, and exact description.

The invention relates to pressure-controlled automatic valves such as are used in fire-extinguishers of the stationary sprinkler type; and its object is to provide a new and improved dry valve more especially designed for use in the pipe-line between the main water-supply pipe leading from the storage tank or reservoir and the water-distributing pipes of the system, normally filled with air under pressure, the valve being simple and durable in construction and arranged to prevent leakage of air and water from the water-supply pipe to the air-filled distributing-pipe and consequent sealing of the valve, thus allowing the valve to open positively on the reduction of air-pressure in the distributing-pipe in case of fire.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement, showing the valve in a closed position. Fig. 2 is a similar view of the same, showing the valve in an open position. Fig. 3 is a cross-section of the valve on the line 3 3 of Fig. 1, and Fig. 4 is a reduced side elevation of a modified form of the valve.

The body A of the dry valve is provided with an air-chamber B and a water-chamber C, connected with each other by an open connection D, forming in its bottom a drip-pan. The air-chamber B is connected with the distributing-pipe E of the stationary sprinkler system, which pipe E is normally filled with air under pressure, and the water-chamber C is connected by the pipe F with a water-supply, such as an overhead tank or reservoir. The valve G within the air-chamber B is normally held on a seat B' by air-pressure within the air-chamber, as plainly indicated in Fig. 1, and the said valve G is provided with a hollow stem G', extending through the connection D and the water-chamber C and mounted to slide in alined stuffing-boxes H, H', and H², of which the stuffing-box H is on the air-chamber B and the stuffing-boxes H' H² are on opposite sides of the water-chamber C.

On the outer reduced end G² of the valve-stem G' is secured a handle G³, adapted to form a stop and arranged to abut against the stuffing-box H² (see Fig. 2) to limit the opening movement of the valve, the said handle G³ also serving to enable the operator to turn the valve G, so as to firmly bind it on its seat B' or to prevent leakage of air from the chamber B. The valve-stem G' is provided with the admission-ports $a$, located on the reduced portion G², and with the outlet-ports $b$, located a distance from the valve G, the said ports being so spaced apart that when the valve G is in a closed position, as shown in Fig. 1, the inlet-ports $a$ are outside of the stuffing-box H², while the ports $b$ extend between the stuffing-boxes H and H' in the connection D. Thus when the valve is in this position the interiors of the chambers C and B are disconnected from each other; but when the valve is moved into an open position, as shown in Fig. 2, then the ports $a$ are within the water-chamber C and the ports $b$ extend within the air-chamber B, so that communication is established between the said chambers C and B by way of the ports $a$, hollow valve-stem G', and ports $b$. (See Fig. 2.)

The valve G is normally held in a closed position by the preponderance of air-pressure exerted against the face of the said valve within the chamber B to hold the said valve G against its seat B' and against the pressure of the water exerted against the shoulder G⁴ formed on the valve-stem G' at the reduced portion G², the said shoulder G⁴ extending within the water-chamber C. Now in case the fusible sprinkler-head on the distributing-pipe E is opened by fire, then air escapes from the distributing-pipe E and the chamber B to reduce the pressure of air on the face of the valve G to such an extent that the preponderance of pressure is now exerted by the water against the shoulder $G^4$ in the chamber C to cause the valve G to move into an open position, as indicated in Fig. 2. When this takes place, the valve-stem establishes communication between the chambers C and B, as previously explained, to allow the water to flow from the chamber C by way of the ports $a$, hollow stem G', and ports $b$ into the chamber B to the distributing-pipe E and to the fire to extinguish the same.

The valve G may be moved from a closed position into an open position by other means than the one described above—that is, the valve may be arranged in an upright position, as indicated in Fig. 4—and in this case the shoulder $G^4$ may be omitted, as the valve then moves into an open position by its own weight as soon as the air-pressure in the chamber B is reduced, as above explained.

Now when the valve is in a closed position, as previously explained, then leakage of air from the chamber B is prevented by the valve G being firmly held to its seat B', and any water that may leak from the chamber C past the stuffing-box H' cannot pass into the chamber B, and thus seal the valve G, as the said water passes from the stuffing-box H' into the drip-pan of the open connection D, from which the water may be conducted to the ground or other place of discharge.

Devices of this character are hung up normally inactive, sometimes for a period of years, before the emergency arises requiring their operation. This being the case there is always danger of the escape of air from the chamber B, which would cause the piston G to operate at an inopportune time and the device would be practically worthless when the emergency requiring its use should arise. Hence it is desirable that mechanism of this character should be so constructed that although much of the air in the chamber B should escape the comparatively light pressure still remaining would serve to hold the piston G firmly in its inoperative position, even though there should be unusual pressure at times in the water-chamber. This advantage we have embodied in our piston by the use of the shoulder $G^4$, since the area of said shoulder is very small compared with the area of the end of the valve in the air-chamber. Hence a comparatively light pressure in the air-chamber will predominate over a heavy pressure in the water-chamber. Combined with the advantages just stated we also have the water-pressure to rely upon for promptly bringing the valve into operative position when a fire occurs.

Having thus described our invention, we claim as new and desire to secure by Letters Patent—

1. A dry valve comprising an air-chamber, a water-chamber, a hollow valve, normally cutting off communication between said chambers and extending into the open air, inlet-ports and outlet-ports in said valve, the former normally outside the casing in the open air, said ports adapted when the valve is in operative position to respectively connect the water and air chambers by means of the central opening of the valve as specified and shown.

2. A dry valve comprising a casing, an inlet-opening at one end thereof, and an outlet-opening at the other end, an elongated hollow piston having an enlarged member and a reduced member, openings in the enlarged member, near the end of the piston, openings in the reduced member, near the other end of the piston, said piston being adapted to have air-pressure against one end of said enlarged member and water-pressure against the other, and to be automatically moved into or out of operative position by the predominance of one or the other of said opposing pressures, and a stop at each end of the piston for limiting the movement thereof, as specified and shown.

3. A dry valve comprising a casing, an inlet-opening at one end and an outlet-opening at the other end thereof, a hollow elongated piston with closed ends, said piston having an enlarged member and a reduced member, openings in the enlarged member, near one end of the piston, openings in the reduced member near the other end thereof, said piston adapted to have air-pressure normally against one end of said enlarged member and water-pressure against the other end thereof, a stop on the extreme end of the larger member of the piston for limiting its movement in one direction and a stop on the outer end of the reduced member for limiting the movement of the piston in the opposite direction, said latter stop being without the valve-casing in the open air, said openings near the ends of the two members of the piston being adapted to form a connection through the hollow of the piston, between the inlet and the outlet openings of the casing when the valve is in operative position, as set forth.

4. A dry valve comprising a casing having two chambers, each normally containing an agent under compression, an elongated hollow piston-valve normally cutting off communication between said chambers, and automatically movable back and forth between them, being pressed in one direction by the agent in one of the chambers and in the other direction by the agent in the other chamber, and adapted to be moved in one direction or the other, according as the pressure on one end predominates over the pressure on the other, said valve having openings near each end thereof leading into its hollow portion, said hollow portion and openings being adapted to form a connection between the two chambers when the piston is in its abnormal position and means whereby a light pressure in a given one of the chambers predominates over a greater pressure in the other to control the piston in a predetermined position as specified and for the purpose set forth.

5. A dry valve, comprising an air-chamber, a water-chamber, an open connection between the chambers, and a valve in the said air-chamber, normally seated on a seat therein by the pressure of the air in the air-chamber against the valve, the valve having a hollow stem closed at the outer end and provided with spaced inlet and outlet ports, out of register with the chambers at the time the valve is closed and adapted to open into the chambers when the valve is open, the said stem having a shoulder within the water-chamber, as set forth.

In testimony whereof we have signed our names to this specification in the presence of two subscribing witnesses.

JAMES KING STRINGFIELD RAY.
WILLIAM DAVID McNEILL.

Witnesses:
R. E. PATTERSON, Jr.,
T. W. COLEMAN.